US012530453B2

(12) United States Patent
Gadhe

(10) Patent No.: US 12,530,453 B2
(45) Date of Patent: Jan. 20, 2026

(54) DYNAMIC DATA CONTAINERIZATION USING HASH DATA ANALYTICS

(71) Applicant: Honeywell International Inc., Charlotte, NC (US)

(72) Inventor: Ganesh P. Gadhe, Phoenix, AZ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 530 days.

(21) Appl. No.: 17/686,615

(22) Filed: Mar. 4, 2022

(65) Prior Publication Data

US 2022/0284096 A1 Sep. 8, 2022

Related U.S. Application Data

(60) Provisional application No. 63/157,108, filed on Mar. 5, 2021.

(51) Int. Cl.
*G06F 21/00* (2013.01)
*G06F 21/56* (2013.01)
*G06F 21/57* (2013.01)

(52) U.S. Cl.
CPC .......... *G06F 21/565* (2013.01); *G06F 21/577* (2013.01); *G06F 2221/034* (2013.01)

(58) Field of Classification Search
CPC .............................. G06F 21/565; G06F 21/577
See application file for complete search history.

(56) References Cited

U.S. PATENT DOCUMENTS

| | | | |
|---|---|---|---|
| 2017/0185785 A1* | 6/2017 | Vorona | G06F 21/552 |
| 2018/0316708 A1* | 11/2018 | Strong | H04L 43/04 |
| 2020/0412725 A1* | 12/2020 | Devane | H04L 63/1433 |
| 2021/0097569 A1* | 4/2021 | Devane | H04L 63/1425 |

* cited by examiner

*Primary Examiner* — William J. Goodchild
*Assistant Examiner* — Thong P Truong
(74) *Attorney, Agent, or Firm* — Alston & Bird LLP

(57) ABSTRACT

Various embodiments described herein relate to dynamic data containerization using hash data analytics. In this regard, an indication of a peripheral device being communicatively coupled to an industrial control system is received. In response to the indication, reputation data for one or more industrial control files stored by the peripheral device is determined based on a comparison between a file hash of one or more industrial control files and one or more security threat hashes. Furthermore, the reputation data for the one or more industrial control files is stored in a dynamic database container. In response to a determination that a validity time period for the dynamic database container satisfies a defined criterion, new reputation data for the one or more industrial control files is determined and the new reputation data for the one or more industrial control files is stored in a new dynamic database container.

20 Claims, 9 Drawing Sheets

DYNAMIC DATA CONTAINERIZATION USING HASH DATA ANALYTICS

CROSS REFERENCE TO RELATED APPLICATIONS

This application claims the benefit of U.S. Provisional Patent Application No. 63/157,108, titled "DYNAMIC DATA CONTAINERIZATION USING HASH DATA ANALYTICS," and filed on Mar. 5, 2021, the entirety of which is hereby incorporated by reference.

TECHNICAL FIELD

The present disclosure relates generally to dynamic data containerization, and more particularly to dynamic data containerization using hash data analytics in an industrial control system.

BACKGROUND

In industrial control systems (ICS) and industrial internet of things (IIoT) environments, identification of vulnerable industrial computing product running in the computing environment has historically been difficult. In ICSs, resources for vulnerability analysis are often limited, for example, due to issues such as lack of Internet activity, interoperability issues, limitations on computing resources such as central processing unit (CPU), memory, input/output (I/O) constraints, or the like. Moreover, it is generally difficult to manage reputation of industrial computing product in ICS and IIoT environments. For example, there are generally numerous industrial computing products in ICS and IIoT environments for which reputation is not known. Furthermore, reputation of industrial computing products in ICS and IIoT environments often change over time.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system comprises one or more processors, a memory, and one or more programs stored in the memory. The one or more programs comprise instructions configured to receive an indication of a peripheral device being communicatively coupled to an industrial control system. The one or more programs also comprise instructions configured to, in response to the indication, determine reputation data for one or more industrial control files stored by the peripheral device based on a comparison between a file hash of one or more industrial control files and one or more security threat hashes. The one or more programs also comprise instructions configured to, in response to the indication, store the reputation data for the one or more industrial control files in a dynamic database container. The one or more programs also comprise instructions configured to, in response to the indication and in response to a determination that a validity time period for the dynamic database container satisfies a defined criterion, determine new reputation data for the one or more industrial control files and/or store the new reputation data for the one or more industrial control files in a new dynamic database container.

In another embodiment, a method comprises, at a device with one or more processors and a memory, receiving an indication of a peripheral device being communicatively coupled to an industrial control system. In response to the indication, the method comprises determining reputation data for one or more industrial control files stored by the peripheral device based on a comparison between a file hash of one or more industrial control files and one or more security threat hashes. Also in response to the indication, the method comprises storing the reputation data for the one or more industrial control files in a dynamic database container. Also in response to the indication and in response to a determination that a validity time period for the dynamic database container satisfies a defined criterion, the method comprises determining new reputation data for the one or more industrial control files and/or storing the new reputation data for the one or more industrial control files in a new dynamic database container.

In yet another embodiment, a non-transitory computer-readable storage medium comprises one or more programs for execution by one or more processors of a device. The one or more programs comprise instructions which, when executed by the one or more processors, cause the device to receive an indication of a peripheral device being communicatively coupled to an industrial control system. The one or more programs also comprise instructions which, when executed by the one or more processors, cause the device to, in response to the indication, determine reputation data for one or more industrial control files stored by the peripheral device based on a comparison between a file hash of one or more industrial control files and one or more security threat hashes. The one or more programs also comprise instructions which, when executed by the one or more processors, cause the device to in response to the indication, store the reputation data for the one or more industrial control files in a dynamic database container. The one or more programs also comprise instructions which, when executed by the one or more processors, cause the device to, in response to the indication and in response to a determination that a validity time period for the dynamic database container satisfies a defined criterion, determine new reputation data for the one or more industrial control files and/or store the new reputation data for the one or more industrial control files in a new dynamic database container.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
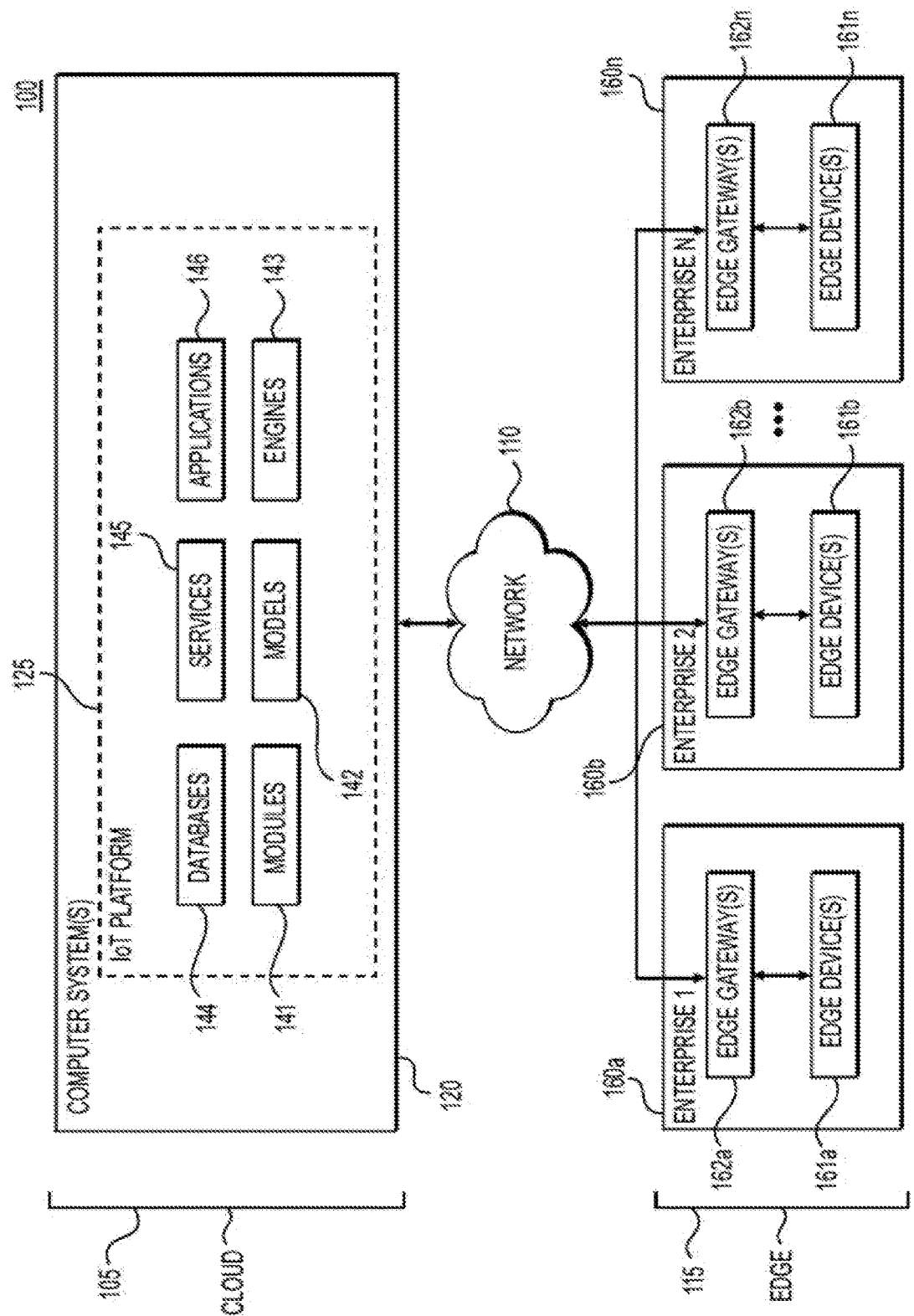
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In industrial environments, cyber security is of increasing concern and it is generally difficult to efficiently determine a potential source of risk to an industrial system associated with an industrial environment. For example, modern industrial control systems generally contain peripheral devices such as, for example, a flash drive, a smart card, universal serial bus (USB) device, a composite device, a vendor defined device field device, etc. that can provide a potential source of risk to the industrial control system. In an aspect, when files in a peripheral device are provided to an air gapped network (e.g., an industrial control system environment, an industrial internet of things environment, etc.), it is generally difficult to know at a later point of time if reputation (e.g., security reputation) for the files have changed. For example, before entering an air gapped network, a file reputation may be good or unknown, and after a certain amount of time the file reputation may change it to malicious or vulnerable. Currently, it is generally difficult for air gapped networks (e.g., industrial control systems, an industrial internet of things systems, etc.) to determine and/or manage file reputation changes. For example, air gapped networks (e.g., industrial control systems, an industrial internet of things systems, etc.) generally include a large number of files for which reputation is not known, resulting in inefficiencies and/or security threats for the air gapped network.

Thus, to address these and/or other issues, dynamic data containerization using hash data analytics is provided. In one or more embodiments, a dynamic container to store a file reputation of a file (e.g., an industrial control file) is generated. In one or more embodiments, a validity period is defined for the dynamic container. In response to a determination that the validity period is over, the file reputation is redetermined and/or a new dynamic container is generated. In one or more embodiments, after file analysis is performed for unknown files, file hashes and/or reputation results of files are stored in one or more data containers. In one or more embodiments, it is determined whether a customer is associated with multiple secure media exchange units. If yes, then the reputation data is synched with other secure media exchange units. As such, all secure media exchange units may share information and/or scanning of new files may be reduced. In one or more embodiments, if a same file hash is observed in a new peripheral device during the container validity period. then instead of scanning the new peripheral device, the file reputation is determined using one or more previously generated database containers.

As such, by employing one or more techniques disclosed herein, performance of an industrial control system is improved. Security for an industrial control system is additionally or alternatively improved by employing one or more techniques disclosed herein. Moreover, a number of computing resources, a number of a storage requirements, and/or number of errors associated with authorization of a peripheral device with respect to an industrial control system is reduced by employing one or more techniques disclosed herein.

As used herein, the terms "data," "content," "digital content," "digital content object," "information," and similar terms is used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data is received directly from another computing device or indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data is sent directly to another computing device or is sent indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which is differentiated from a "computer-readable transmission medium," which refers to an electromagnetic signal.

The term "industrial control system" (ICS) refers to a computing system that includes one or more industrial control system computing components that each are connected to a device or machinery in an industrial system. For example, in one or more embodiments, an ICS is a supervisory control and data acquisition system that includes several programmable logic controllers distributed in various locations that provide long distance monitoring and control of field sites through a centralized control system. In one or more embodiments, an ICS is a distributed control system that is configured to control various ICS computing components that take the form of operational technology hardware and software systems. In one or more embodiments, the ICS computing components that take the form of operational technology hardware and software systems is configured as various controllers that control an industrial production process.

The term "ICS computing component" refers to computing hardware and software system in an ICS. For example, in one or more embodiments, the ICS computing component is configured as operational technology hardware and software systems that monitors or controls physical devices in the industrial control system. Example physical devices include manufacturing equipment, monitoring equipment such as storage or device monitoring equipment, manufacturing material moving equipment, or other equipment used in an industrial production site. In one or more embodiments, the ICS computing component is configured as a programmable logic controller that provides local management of processes being run through feedback devices such as sensors and actuators. In one or more embodiments, the ICS computing component is configured as a master terminal unit in a supervisory control and data acquisition system that is configured to transmit commands to or receive information from one or more remote terminal units, a remote terminal unit, a human machine interface, a control server, intelligent electronic devices that is associated with another physical device in the industrial system, or the like.

The term "industrial control files" refers to files generated by, transmitted to, or to be transmitted to an ICS computing component. Example industrial control files include, by way of example, industrial control system drivers in an ICS, process information in an ICS, command data, data generated by a master terminal unit or a remote terminal unit, data generated by a control server, data generated by sensors and actuators, data generated by intelligent electronic devices that is associated with physical device in the industrial system, metadata associated with generation or transmission of data of ICS computing components. In one or more embodiments, an industrial control file includes one or more information items that is designated as predictive indicators for determining whether the ICS computing component that the industrial control file is generated from or being transmitted to is potentially vulnerable.

The term "secure media exchange node" refers to computer hardware and/or software configured to receive one or more industrial control files and generate a file hash of the one or more industrial control files. In one or more embodiments, the one or more industrial control files are stored on the secure media exchange node. In one or more embodiments, the one or more industrial control files are stored on a memory or data store communicatively coupled to the secure media exchange node. In one or more embodiments, the one or more industrial control files are stored on a peripheral device such as, for example, a plug and play portable storage device. For example, in one or more embodiments, the one or more industrial control files are stored on a universal serial bus (USB) based storage device, or other physical, portable storage device, such as flash-based storage, memory-card based storage, and/or the like to be connected to an ICS computing component associated with the one or more industrial control files. For example, in an embodiment, the USB based storage device is connected to the secure media exchange node before the USB based storage device is connected to the ICS computing component to transmit the one or more industrial control files to the ICS computing component. In one or more embodiments, the USB based storage device stores one or more industrial control files generated by the ICS computing component and transmits the one or more industrial control files to the secure media exchange node via a USB. In one or more embodiments, the secure media exchange node is a device physically located within an industrial production site that the ICS operates in.

The term "vulnerability analysis" refers to a file or data structure representing one or more vulnerabilities or potential vulnerabilities that are present in one or more ICS computing components. For example, in one or more embodiments, a vulnerability analysis includes data representative of one or more known security threats and/or a data indicating that one or more ICS computing components are potentially vulnerable and requires maintenance.

The term "ICS computing component information item" refers to data generated by or received by a vulnerability server regarding one or more ICS computing components based on file hashes received from a secure media exchange node. In one or more embodiments, example ICS computing component information items include threat indicators representing one or more known security threats, predictive indicators representing potential security vulnerabilities that take the form of a version number associated with at least one of the one or more industrial control files, an update timestamp associated with at least one of the one or more industrial control files, or an outdated file flag representing that one or more files associated with at least one of the one or more industrial control files is not in the one or more industrial control files.

The term "threat indicator" refers to a data structure generated by a vulnerability server based on matching of file hashes received from a secure media exchange node and a file hash stored in an ICS computing component hash information database that represents a potential security threat in an ICS associated with the secure media exchange node.

The term "predictive indicator" refers to a data structure for predicting potential vulnerabilities associated with an industrial file. In one or more embodiments, a predictive indicator is stored along with a file hash of the industrial file. In one or more embodiments, a predictive indicator includes, by way of example, one or more of: a version number associated with at least one of the one or more industrial control files, an update timestamp associated with at least one of the one or more industrial control files, an outdated file flag representing that one or more files associated with at least one of the one or more industrial control files is not in the one or more industrial control files, or another form of indicator associated with the one or more file hashes.

The term "secure media exchange vulnerability portal" refers to an interface configured to render data included in a vulnerability analysis. For example, in one or more embodiments, the secure media exchange vulnerability portal is configured as a web-based portal that is accessible to one or more computing entities. In one or more embodiments, the secure media exchange vulnerability portal is rendered on the secure media exchange node. In one or more embodiments, the secure media exchange vulnerability portal is rendered on another device.

FIG. 1 illustrates an exemplary networked computing system environment 100, according to the present disclosure. As shown in FIG. 1, networked computing system environment 100 is organized into a plurality of layers including a cloud layer 105, a network layer 110, and an edge layer 115. As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160$a$-160$n$ each including one or more edge devices 161$a$-161$n$ and one or more edge gateways 162$a$-162$n$. For example, a first enterprise 160$a$ includes first edge devices 161$a$ and first edge gateways 162$a$, a second enterprise 160$b$ includes second edge devices 161$b$ and second edge gateways 162$b$, and an nth enterprise 160$n$ includes nth edge devices 161$n$ and nth edge gateways 162$n$. As used herein, enterprises 160$a$-160$n$ represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or vehicle that includes any number of local devices.

Figure 2:
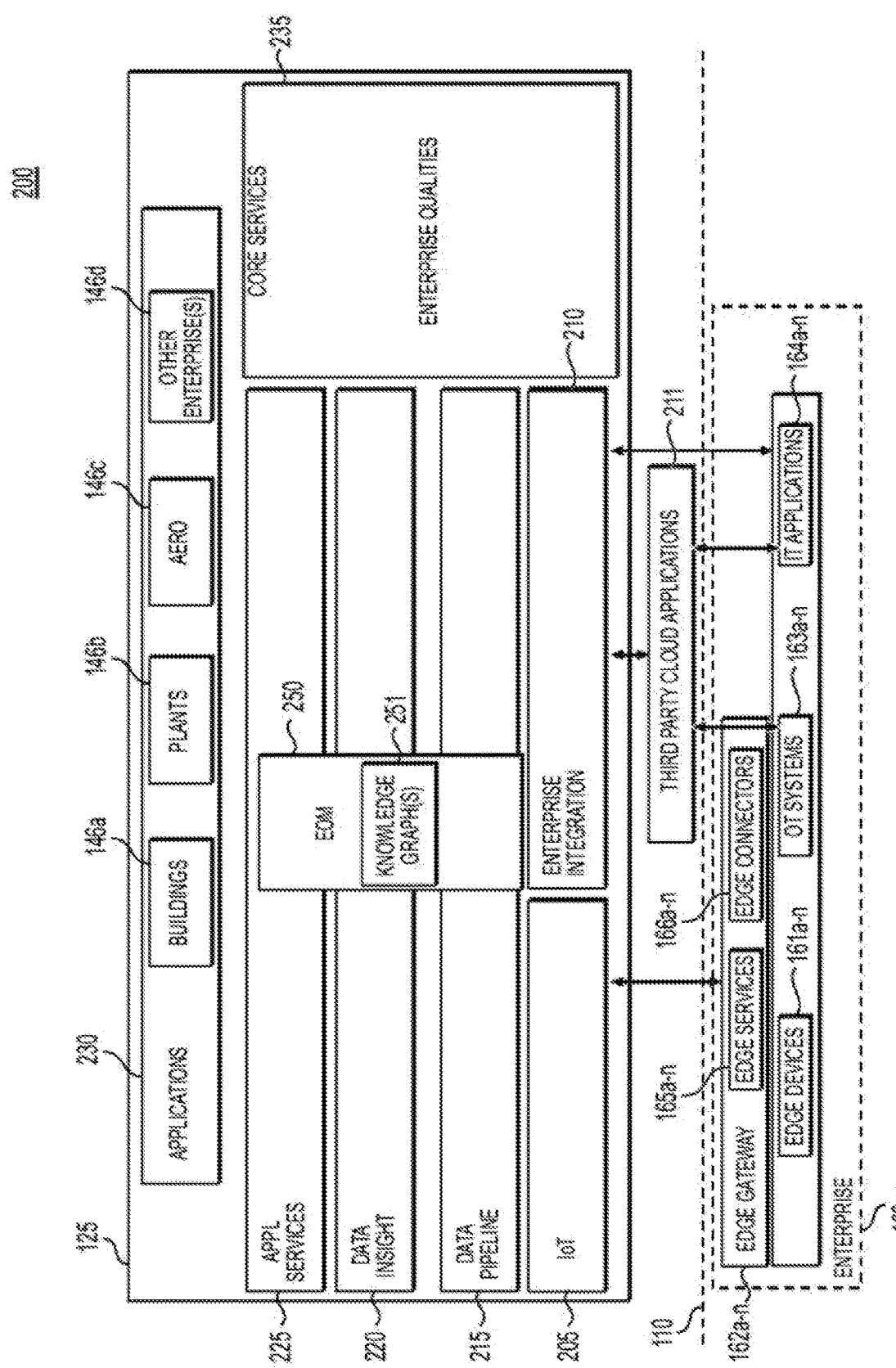
FIG. 2 illustrates a schematic block diagram of a framework of an IoT platform of the networked computing system, in accordance with one or more embodiments described herein.

According to various embodiments, the edge devices 161$a$-161$n$ represent any of a variety of different types of devices that may be found within the enterprises 160$a$-160$n$. Edge devices 161$a$-161$n$ are any type of device configured to access network 110, or be accessed by other devices through network 110, such as via an edge gateway 162$a$-162$n$. According to various embodiments, edge devices 161$a$-161$n$ are "IoT devices" which include any type of network-connected (e.g., Internet-connected) device. For example, in one or more embodiments, the edge devices 161a-161n include sensors (e.g., one or more air quality sensors, one or more humidity sensors, one or more temperature sensors, one or more air flow sensor, and/or one or more other sensors), air handler units, fans, actuators, processors, computers, valves, pumps, ducts, vehicle components, cameras, displays, doors, windows, security components, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, in certain embodiments, the extensible object model 250 communicates with each layer 205-230 to contextualize site data of the enterprise 160a-160n using an extensible object model (or "asset model") and knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a key performance indicator (KPI) framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 250 can automatically map the tag to the attribute based on naming conventions, parsing, and matching the tag and attribute descriptions and/or by comparing the behavior of the time series data with expected behavior.

In certain embodiments, the modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 250 receiving raw model data from the edge 115 and running context discovery algorithms to generate the model. The context discovery algorithms read the context of the edge naming conventions of the edge devices 161a-161n and determine what the naming conventions refer to. For example, in one or more embodiments, the knowledge graph 250 receives "TMP" during the modeling phase and determine that "TMP" relates to "temperature." The generated models are then published. In certain embodiments, the complex onboarding process includes the knowledge graph 250 receiving the raw model data, receiving point history data, and receiving site survey data. According to various embodiments, the knowledge graph 250 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, in one or more embodiments, data is ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT platform 205. In some embodiments, only authorized data is sent to the IoT platform 125, and the IoT platform 125 only accepts data from authorized edge gateways 162a-162n and/or edge devices 161a-161n. According to various embodiments, data is sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third-party applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, in one or more embodiments, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161a-161n). For example, in an embodiment, a fan template defines fan efficiency calculations such that every time a fan is configured, the standard efficiency calculation is automatically executed for the fan. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161a-161n) instance is created, any associated calculation instances are also created with their input and output parameters linked to the appropriate attributes of the asset (e.g., edge device 161a-161n).

According to various embodiments, the IoT platform 125 supports a variety of different analytics models including, for example, curve fitting models, regression analysis models, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160a-160n looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about optimal corrective actions to take. Initially, the recommendations are based on expert knowledge that has been preprogrammed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, in certain embodiments, process design is integrated with feed conditions. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, according to various embodiments, the applications 146a-d includes a buildings application 146a, a plants application 146b, an aero application 146c, and other enterprise applications 146d. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance, asset health, and/or asset predictive maintenance. According to various embodiments, autonomous control includes energy optimization and/or predictive maintenance. As detailed above, according to various embodiments, the general applications 146 is extensible such that each application 146 is configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/ entitlements, logging/monitoring, usage metering, API gateway/dev portal, and the IoT platform 125 streams.

Figure 3:
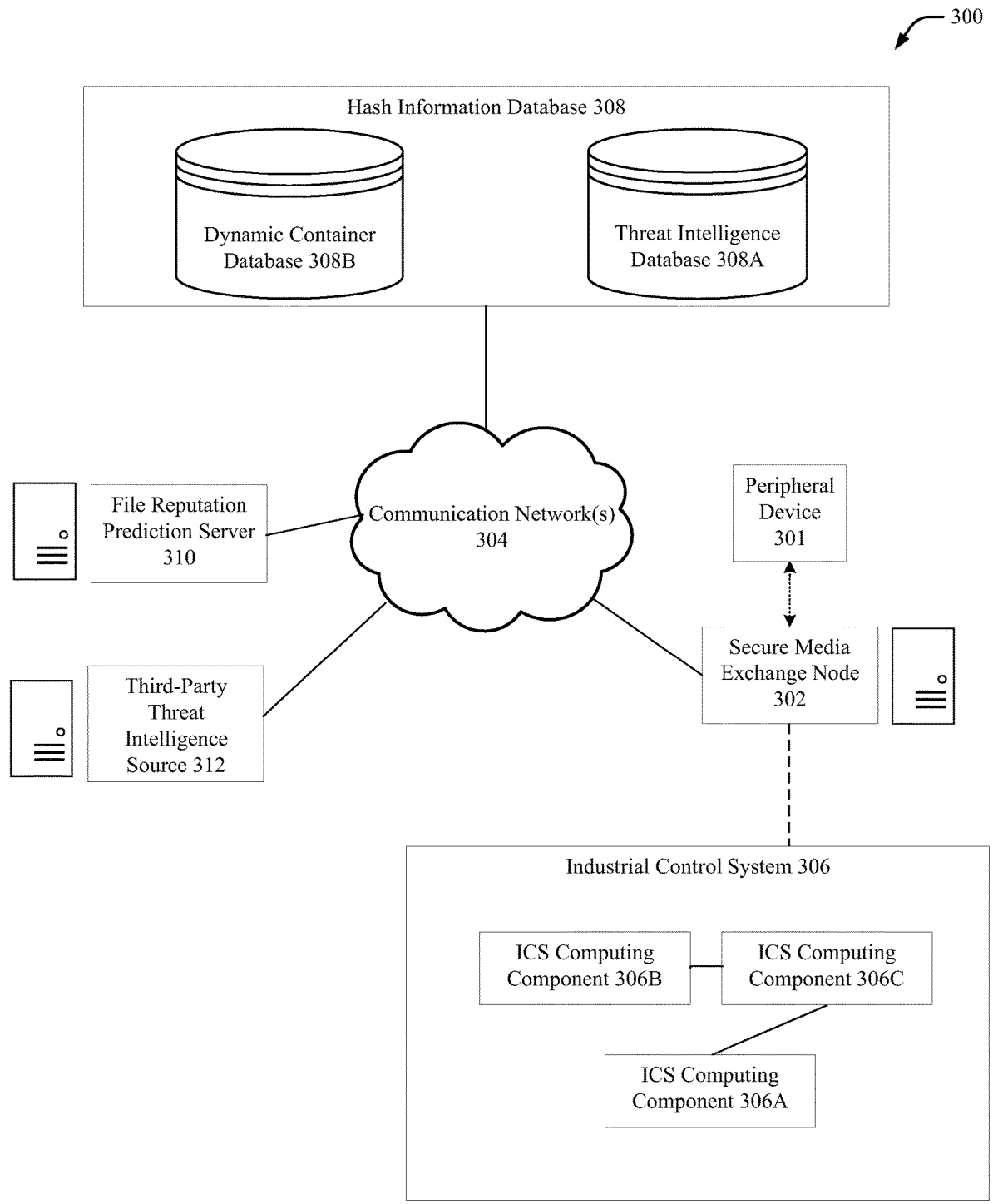
FIG. 3 illustrates a system architecture diagram, in accordance with one or more embodiments described herein.

FIG. 3 illustrates a system architecture diagram of one or more embodiments of the present disclosure. In one or more embodiments, a secure media exchange node 302 is embodied as a computer, a tablet computer, or the like. The secure media exchange node 302 is configured to receive one or more industrial control files transmitted to an industrial control system 306 and/or generated from the industrial control system 306 or receive. In one or more embodiments, the industrial control system 306 includes one or more industrial control system (ICS) computing components 306A to 306C. In one or more embodiments, the industrial control system 306 is a computing system that is not connected to a communication network 304, or any communication network that is connected to the Internet. In certain embodiments, at least a portion of the communication network 304 corresponds to at least portion of the network 110. In one or more embodiments, the industrial control system 306 is associated with components of the edge 115 such as, for example, one or more enterprises 160a-160n. In one or more embodiments, one or more portions of the industrial control system 306 includes the one or more edge devices 161a-161n.

In one or more embodiments, the one or more industrial control files are stored on a peripheral device 301. The peripheral device 301 is configured to be communicatively coupled to the industrial control system 306. For example, in one or more embodiments, the peripheral device 301 is configured to be communicatively coupled to the industrial control system 306 via the secure media exchange node 302. In one or more embodiments, the peripheral device 301 is configured to be to be connected to an ICS computing component associated with the one or more industrial control files. In one or more embodiments, the peripheral device 301 is connected to the secure media exchange node 302 before the peripheral device 301 is connected to the ICS computing component to transmit the one or more industrial control files to the ICS computing component. In one or more embodiments, the peripheral device 301 is a portable storage device such as, for example, a USB based storage device. In another embodiment, the peripheral device 301 is a flash drive. In another embodiment, the peripheral device 301 is a smart card. In another embodiment, the peripheral device 301 is a composite device. In another embodiment, the peripheral device 301 is a vendor defined device field device. However, it is to be appreciated that, in certain embodiments, the peripheral device 301 is a different type of portable storage device. In one or more embodiments, the peripheral device 301 stores one or more industrial control files generated by the ICS computing component and provides the one or more industrial control files to the secure media exchange node 302.

In one or more embodiments, the secure media exchange node 302 communicates with, via the communication network 304, a file reputation prediction server 310. In one or more embodiments, the secure media exchange node 302 transmits one or more hashes (e.g., one or more file hashes) of the one or more industrial control files to the file reputation prediction server 310 via the communication network 304. In one or more embodiments, the secure media exchange node 302 is a device physically located within an industrial production site that the industrial control system 306 operates in. In one or more embodiments, the secure media exchange node 302 is embodied as a computer or two or more computers. In one or more embodiments, the secure media exchange node 302 is not directly connected to the industrial control system 306 via any form of connection network. In such embodiments, the secure media exchange node 302 receives the one or more industrial control files via the peripheral device 301.

In one or more embodiments, the file reputation prediction server 310 queries a hash information database 308 with a file hash received from the secure media exchange node 302. In one or more embodiments, the file reputation prediction server 310 is embodied as a computer or two or more computers. In one or more embodiments, the file reputation prediction server 310 is configured for receiving electronic data from various sources, including but not necessarily limited to the secure media exchange node 302. For example, in one or more embodiments, the file reputation prediction server 310 is configured to transmit and/or receive file hashes to or from the secure media exchange node 302. In one or more embodiments, the file reputation prediction server 310 is in communication with the hash information database 308 through the communication network 304.

In one or more embodiments, the hash information database 308 includes one or more databases, such as a threat intelligence database 308A and/or a dynamic container database 308B. In one or more embodiments, the hash information database 308 stores one or more file hashes. In one or more embodiments, the one or more file hashes are identified, in the hash information database 308, as a safe file hash (e.g., allow file hash) or a security threat hash (e.g., block file hash). In one or more embodiments, the one or more file hashes are additionally or alternatively associated with one or more file reputations, one or more ICS computing component identifiers, one or more predictive indicators, one or more threat indicators, or the like.

According to one or more embodiments, communications network 104 includes any wired or wireless communication network including, for example, a wired or wireless Personal Area Network (PAN), Local Area Network (LAN), Metropolitan Area Network (MAN), Wide Area Network (WAN), and/or the like. For example, in various embodiments, the one or more communication networks 104 described herein are configured to use any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Bluetooth protocols, wireless universal serial bus (USB) protocols, and/or any other wireless protocol.

According to one or more embodiments, the hash information database 308 is embodied as a data storage device such as a Network Attached Storage (NAS) device or devices, or as a separate database server or servers. The hash information database 308 includes file hashes of one or more industrial files and/or reputation data associated with the file hashes. For example, in one or more embodiments, the hash information database 308 includes, without limitation, file reputations associated with file hashes, file flags associated with the file hashes, updated timestamps associated with the file hashes, version numbers associated with the file hashes, predictive indicators associated with the file hashes, threat indicators associated with the file hashes, or the like. In one or more embodiments, the threat intelligence database 308A includes one or more security threat hashes which are file hashes for industrial control files with known security threats. In one or more embodiments, the dynamic container database 308B includes one or more reputation indicators associated with one or more file hashes. The reputation indicators provide information regarding file reputation associated with one or more file hashes. In certain embodiments, the reputation indicators include a non-malicious file reputation indicator, a malicious file reputation indicator, a vulnerable file reputation indicator, an unknown file reputation indicator, or another type of file reputation indicator. In one or more embodiments, the predictive indicators include one or more of a version number associated with at least one of the one or more industrial control files, an updated timestamp associated with at least one of the one or more industrial control files, an outdated file flag representing that one or more files associated with at least one of the one or more industrial control files is not in the one or more industrial control files, a flag representing that the one or more industrial files that indicate maintenance, one or more industrial files that are associated with software tools related to maintenance, and/or another form of indicator associated with the one or more file hashes.

In one or more embodiments, the hash information database 308 is periodically updated by communicating, via the communication network 304, with a third-party threat intelligence source 312. In one or more embodiments, the third-party threat intelligence source 312 is embodied as a separate database server or servers managed by an entity that is different from the entity managing the secure media exchange node 302. In one or more embodiments, the hash information database 308 stores one or more ICS system models that include information regarding one or more ICS computing components and association between different models of ICS computing components. For example, in an embodiment, an ICS system model indicates that an ICS computing component with a model number of 89114 by manufacturer ACME is determined to be associated with one or more ICS computing components of different model numbers by manufacturer ACME or a different manufacturer. In one or more embodiments, the ICS system models stored in the hash information database 308 are updated periodically. In one or more embodiments, the hash information database 308 is in communication with the file reputation prediction server 310 through the communication network 304. In one or more embodiments, the hash information database 308 is contained in the file reputation prediction server 310.

Figure 4:
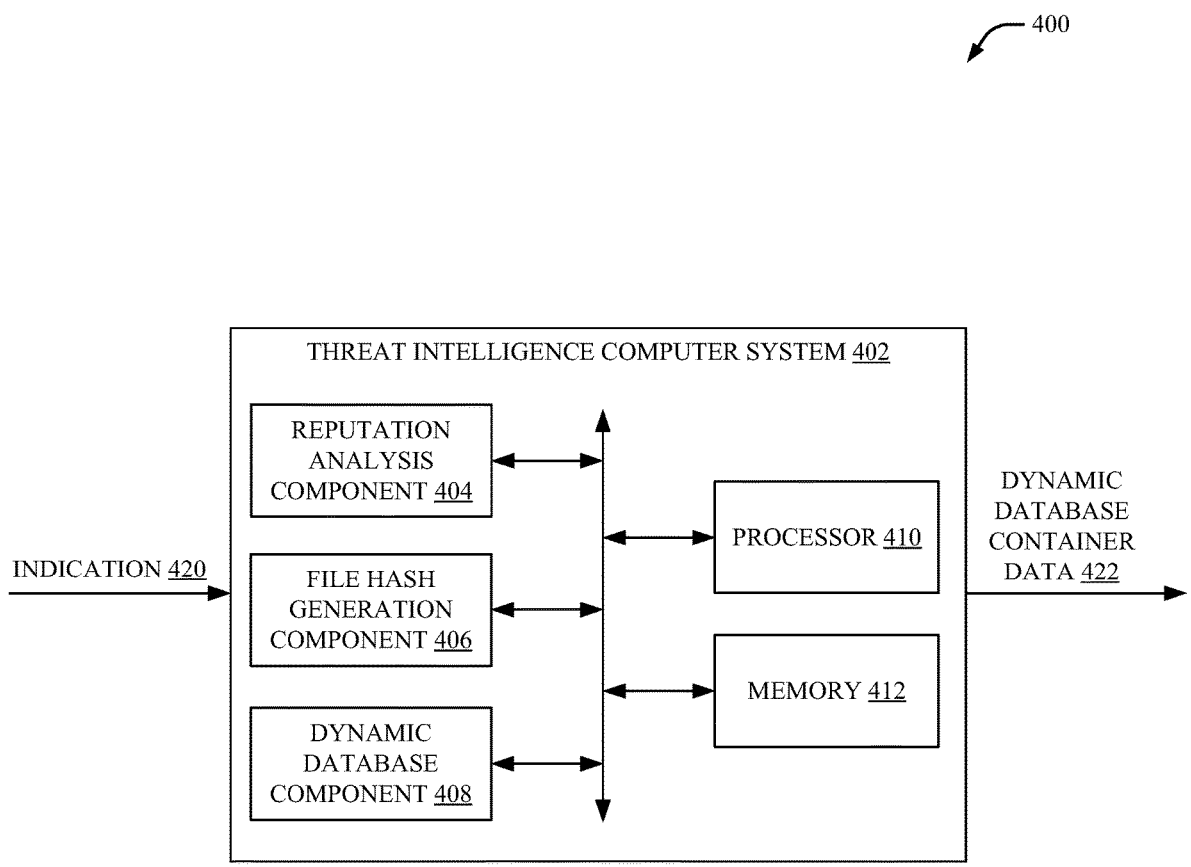
FIG. 4 illustrates a system that provides an exemplary threat intelligence computer system, in accordance with one or more embodiments described herein.

In one or more embodiments, the secure media exchange node 302 or the file reputation prediction server 310, is embodied by one or more computing systems and include one or more components shown in threat intelligence computer system 402 of FIG. 4. According to one or more embodiments, FIG. 4 illustrates a system 400 that provides an exemplary environment according to one or more described features of one or more embodiments of the disclosure. According to an embodiment, the system 400 includes the threat intelligence computer system 402 to facilitate a practical application of threat intelligence perseverance technology, dynamic containerization technology, file reputation management technology, industrial control technology, industrial internet of things (IIoT) technology, hash data analytics technology, edge device technology, cloud computing technology and/or other technology to provide automated configuration, coordination, task planning, scheduling and/or management related to dynamic data containers to store file reputations in an industrial control environment or IIoT environment. In one or more embodiments, the threat intelligence computer system 402 facilitates a practical application of machine learning technology to provide optimization related to threat intelligence perseverance technology, dynamic containerization technology, file reputation management technology, industrial control technology, industrial internet of things (IIoT) technology, hash data analytics technology, edge device technology, and/or cloud computing technology. In one or more embodiments, the threat intelligence computer system 402 provides threat intelligence perseverance using dynamic containerization and/or file reputation change notifications in industrial control and/or IIoT environments using hash data analytics.

In an embodiment, the threat intelligence computer system 402 is a server system (e.g., a server device) that facilitates hash data analytics and/or file reputation prediction for one or more industrial control files. In one or more embodiments, the threat intelligence computer system 402 is a device with one or more processors and a memory. In one or more embodiments, the threat intelligence computer system 402 is a computer system from the computer systems 120. For example, in one or more embodiments, the threat intelligence computer system 402 is implemented via the cloud 105, the secure media exchange node 302, and/or the file reputation prediction server 310. The threat intelligence computer system 402 is also related to one or more technologies, such as, for example, industrial control technologies, IIoT technologies, predictive maintenance technologies, hash data analytics technologies, cloud computing technologies, cloud database technologies, server technologies, network technologies, wireless communication technologies, machine learning technologies, artificial intelligence technologies, digital processing technologies, electronic device technologies, computer technologies, sensor technologies, industrial technologies, data security technologies, asset technologies, process plant technologies, manufacturing technologies, and/or one or more other technologies.

Moreover, the threat intelligence computer system 402 provides an improvement to one or more technologies such as industrial control technologies, IIoT technologies, predictive maintenance technologies, hash data analytics technologies, cloud computing technologies, cloud database technologies, server technologies, network technologies, wireless communication technologies, machine learning technologies, artificial intelligence technologies, digital processing technologies, electronic device technologies, computer technologies, sensor technologies, industrial technologies, data security technologies, asset technologies, process plant technologies, manufacturing technologies, and/or one or more other technologies. In an implementation, the threat intelligence computer system 402 improves performance of a computing device. For example, in one or more embodiments, the threat intelligence computer system 402 improves processing efficiency of a computing device (e.g., a server), reduces power consumption of a computing device (e.g., a server), improves quality of data provided by a computing device (e.g., a server), etc.

The threat intelligence computer system 402 includes a reputation analysis component 404, a file hash generation component 406 and/or a dynamic database component 408. Additionally, in certain embodiments, the threat intelligence computer system 402 includes a processor 410 and/or a memory 412. In certain embodiments, one or more aspects of the threat intelligence computer system 402 (and/or other systems, apparatuses and/or processes disclosed herein) constitute executable instructions embodied within a computer-readable storage medium (e.g., the memory 412). For instance, in an embodiment, the memory 412 stores computer executable component and/or executable instructions (e.g., program instructions). Furthermore, the processor 410 facilitates execution of the computer executable components and/or the executable instructions (e.g., the program instructions). In an example embodiment, the processor 410 is configured to execute instructions stored in the memory 412 or otherwise accessible to the processor 410.

The processor 410 is a hardware entity (e.g., physically embodied in circuitry) capable of performing operations according to one or more embodiments of the disclosure. Alternatively, in an embodiment where the processor 410 is embodied as an executor of software instructions, the software instructions configure the processor 410 to perform one or more algorithms and/or operations described herein in response to the software instructions being executed. In an embodiment, the processor 410 is a single core processor, a multi-core processor, multiple processors internal to the threat intelligence computer system 402, a remote processor (e.g., a processor implemented on a server), and/or a virtual machine. In certain embodiments, the processor 410 is in communication with the memory 412, the reputation analysis component 404, the file hash generation component 406 and/or the dynamic database component 408 via a bus to, for example, facilitate transmission of data among the processor 410, the memory 412, the reputation analysis component 404, the file hash generation component 406 and/or the dynamic database component 408. The processor 410 may embodied in a number of different ways and can, in certain embodiments, includes one or more processing devices configured to perform independently. Additionally or alternatively, in one or more embodiments, the processor 410 includes one or more processors configured in tandem via a bus to enable independent execution of instructions, pipelining of data, and/or multi-thread execution of instructions.

The memory 412 is non-transitory and includes, for example, one or more volatile memories and/or one or more non-volatile memories. In other words, in one or more embodiments, the memory 412 is an electronic storage device (e.g., a computer-readable storage medium). The memory 412 is configured to store information, data, content, one or more applications, one or more instructions, or the like, to enable the threat intelligence computer system 402 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

The reputation analysis component 404 is configured to perform reputation analysis with respect to one or more files (e.g., one or more industrial control files). In an embodiment, the threat intelligence computer system 402 (e.g., the reputation analysis component 404 of the threat intelligence computer system 402) receives an indication 420. In one or more embodiments, the indication 420 is an indication of the peripheral device 301 being communicatively coupled to the industrial control system 306.

In response to the indication 420, the reputation analysis component 404 determines reputation data for one or more industrial control files stored by the peripheral device 301. The reputation data provides a reputation for the one or more industrial control files. For example, in one or more embodiments, the reputation data includes information regarding file reputation associated with one or more file hashes. In certain embodiments, the reputation data includes a non-malicious file reputation indicator for the one or more industrial control files, a malicious file reputation indicator for the one or more industrial control files, a vulnerable file reputation indicator for the one or more industrial control files, an unknown file reputation indicator for the one or more industrial control files, or another type of file reputation indicator for the one or more industrial control files. In one or more embodiments, the reputation analysis component 404 determines reputation data for one or more industrial control files stored by the peripheral device 301 based on a comparison between a file hash of one or more industrial control files and one or more security threat hashes stored in the threat intelligence database 308A. Furthermore, in one or more embodiments, the reputation analysis component 404 stores the reputation data for the one or more industrial control files in a dynamic database container. The dynamic database container is stored, for example, in the dynamic container database 308B. In certain embodiments, the reputation analysis component 404 additionally stores the file hash for the one or more industrial control files in the dynamic database container. In certain embodiments, the reputation analysis component 404 configures the reputation data as a reputation file hash. In one or more embodiments, the reputation analysis component 404 provides dynamic database container data 422 (e.g., the reputation data and/or the file hash) for the dynamic database container.

In one or more embodiments, the reputation analysis component 404 identifies one or more industrial control files included in the peripheral device 301. Furthermore, in one or more embodiments, the file hash generation component 406 generates one or more file hashes of the one or more industrial control files. In certain embodiments, the secure media exchange node 302 transmits a hash query that includes the one or more file hashes to the file reputation prediction server 310.

In one or more embodiments, the reputation analysis component 404 queries the hash information database 308 based on the hash query. For instance, in one or more embodiments, the reputation analysis component 404 queries the hash information database 308 based on the hash query. According to one or more embodiments, the hash information database 308 is embodied as a data storage device such as a Network Attached Storage (NAS) device or devices, or as a separate database server or servers. The hash information database 308 includes file hashes of one or more industrial files and/or data associated with the file hashes. For example, in one or more embodiments, the hash information database 308 includes, without limitation, outdated file flags associated with the file hashes, updated timestamps associated with the file hashes, version numbers associated with the file hashes, predictive indicators associated with the file hashes, threat indicators associated with the file hashes, or the like.

In an embodiment, the reputation analysis component 404 queries the threat intelligence database 308A based on the hash query. For example, in certain embodiments, the reputation analysis component 404 receives and/or generates a hash query that comprises a file hash generated based on the one or more industrial control files stored in the peripheral device 301. Furthermore, in one or more embodiments, the reputation analysis component 404 queries the threat intelligence database 308A associated with one or more security threat hashes based on the hash query. In one or more embodiments, the reputation analysis component 404 compares the hash query (e.g., the one or more file hashes) with one or more hashes stored in the threat intelligence database 308A. The one or more hashes stored in the threat intelligence database 308A are one or more security threat hashes representing one or more security threats associated with one or more industrial control files. In one or more embodiments, the one or more security threats are security threats, such as backdoors, vulnerabilities, viruses, trojans, or the like. In one or more embodiments, the one or more file hashes are each identified, in the threat intelligence database 308A, as a safe file hash, a file hash associated with a predictive indicator, or a security threat hash. In one or more embodiments, the one or more file hashes may be also associated with one or more ICS computing component identifiers, one or more predictive indicators, one or more threat indicators, or the like. In one or more embodiments, the predictive indicators include one or more of a version number associated with at least one of the one or more industrial control files, an updated timestamp associated with at least one of the one or more industrial control files, an outdated file flag representing that one or more files associated with at least one of the one or more industrial control files is not in the one or more industrial control files, a flag representing that the one or more industrial files that indicate maintenance, one or more industrial files that are associated with software tools related to maintenance, and/or another form of indicator associated with the one or more file hashes. In one or more embodiments, a file hash not identified in the threat intelligence database 308A is considered to be a safe file hash. In another embodiment, the reputation analysis component 404 queries the dynamic container database 308B based on the hash query. For example, in one or more embodiments, the reputation analysis component 404 queries the dynamic container database 308B associated with one or more reputation hashes based on the hash. The dynamic container database 308B includes, for example, previously determined reputation data for one or more other industrial control files and/or one or more previous versions of the one or more industrial control files.

In one or more embodiments, the reputation analysis component 404 generates the one or more ICS computing component information items associated with at least one of the one or more ICS computing components 306A-C upon determining that the hash query matches at least one of the one or more hashes stored in the threat intelligence database 308A.

In one or more embodiments, the reputation analysis component 404 generates a vulnerability analysis regarding the industrial control system 306 based on the one or more ICS computing component information items. In an embodiment, a vulnerability analysis is embodied as a file or data structure representing one or more vulnerabilities or potential vulnerabilities that are present in the one or more ICS computing components 306A-C. For example, in one or more embodiments, a vulnerability analysis includes data representative of one or more known security threats and/or data indicating that one or more ICS computing components are potentially vulnerable and require maintenance.

In one or more embodiments, by way of example, the vulnerability analysis is generated by comparing the updated timestamp with a pre-defined timestamp representing a potentially vulnerable version. If the updated timestamp is earlier than the pre-defined timestamp, the vulnerability analysis is generated to indicate that the industrial file associated with the update timestamp is potentially vulnerable. In another example, the vulnerability analysis is generated by determining that the one or more file hashes associated with the industrial files received are associated with an outdated file flag because one or more files associated with at least one of the one or more industrial control files that are pre-defined to be associated with (e.g., because the one or more files should be present, along with the one or more industrial control files received, in a pre-defined non-vulnerable version) at least one of the one or more industrial control files are not in the one or more industrial control files.

In one or more embodiments, the vulnerability analysis is generated by comparing a version number associated with the one or more industrial control files with a pre-defined version number. If the version number associated with the one or more industrial control files indicates that the version of the one or more industrial control files is earlier than a version associated with the pre-defined version number, the vulnerability analysis indicates that the one or more industrial control files are potentially vulnerable. In one or more embodiments, the vulnerability analysis is generated by using a combination of one or more of the example methods described above. In one or more embodiments, the vulnerability analysis generated based on predictive indicators indicates that on-site maintenance is needed at the industrial control system 306.

In one or more embodiments, the reputation analysis component 404 outputs the vulnerability analysis to a secure media exchange vulnerability portal associated with the secure media exchange node 302. A secure media exchange vulnerability portal is an interface configured to render data included in a vulnerability analysis. For example, in one or more embodiments, the secure media exchange vulnerability portal is configured as a web-based portal that is accessible to one or more computing entities. In one or more embodiments, the secure media exchange vulnerability portal is rendered on the secure media exchange node 302. In one or more embodiments, the interface includes a warning message associated with one or more security threats and/or a message indicating on-site maintenance is needed for the industrial control system 306.

In certain embodiments, the dynamic database component 408 is configured to manage one or more dynamic container stored in the dynamic container database 308B. For instance, in response to a determination that a validity time period for the dynamic database container satisfies a defined criterion, the dynamic database component 408 determines new reputation data for the one or more industrial control files. In certain embodiments, the validity time period is determined based on user feedback data provided via a computing device (e.g., provided via user feedback data provided via an electronic interface of a computing device). Additionally, in one or more embodiments, the dynamic database component 408 stores the new reputation data for the one or more industrial control files in a new dynamic database container. The new dynamic container is stored in the dynamic container database 308B. In certain embodiments, in addition to storing the new dynamic container in the dynamic container database 308B, the dynamic database container (e.g., the previous version of the dynamic database container) is deleted from the dynamic container database 308B. In one or more embodiments, the dynamic database container data 422 includes the new reputation data and/or the file hash for the dynamic database container. In one or more embodiments, the dynamic container database 308B is a database for a secure media exchange platform associated with the industrial control system 306.

In certain embodiments, the reputation analysis component 404 determines a customer identifier associated with the peripheral device 301. Furthermore, the reputation analysis component 404 determines determining the reputation data for the one or more industrial control files based on predetermined reputation data associated with the customer identifier. The predetermined reputation data is, for example, previously determine reputation data associated with one or more other industrial control files and/or one or more previous versions of the one or more industrial control files associated with the customer identifier.

In one or more embodiments, the reputation analysis component 404 receives a new indication of a new peripheral device being communicatively coupled to the industrial control system 306. In response to the new indication, the reputation analysis component 404 determines other reputation data for one or more new industrial control files stored by the new peripheral device based on the reputation data stored in the dynamic database container. In certain embodiments, the dynamic database component 408 updates the reputation data stored in the dynamic database container based on the other reputation data. In certain embodiments, the dynamic database component 408 store the other reputation data for the one or more new industrial control files in another dynamic database container.

Figure 5:
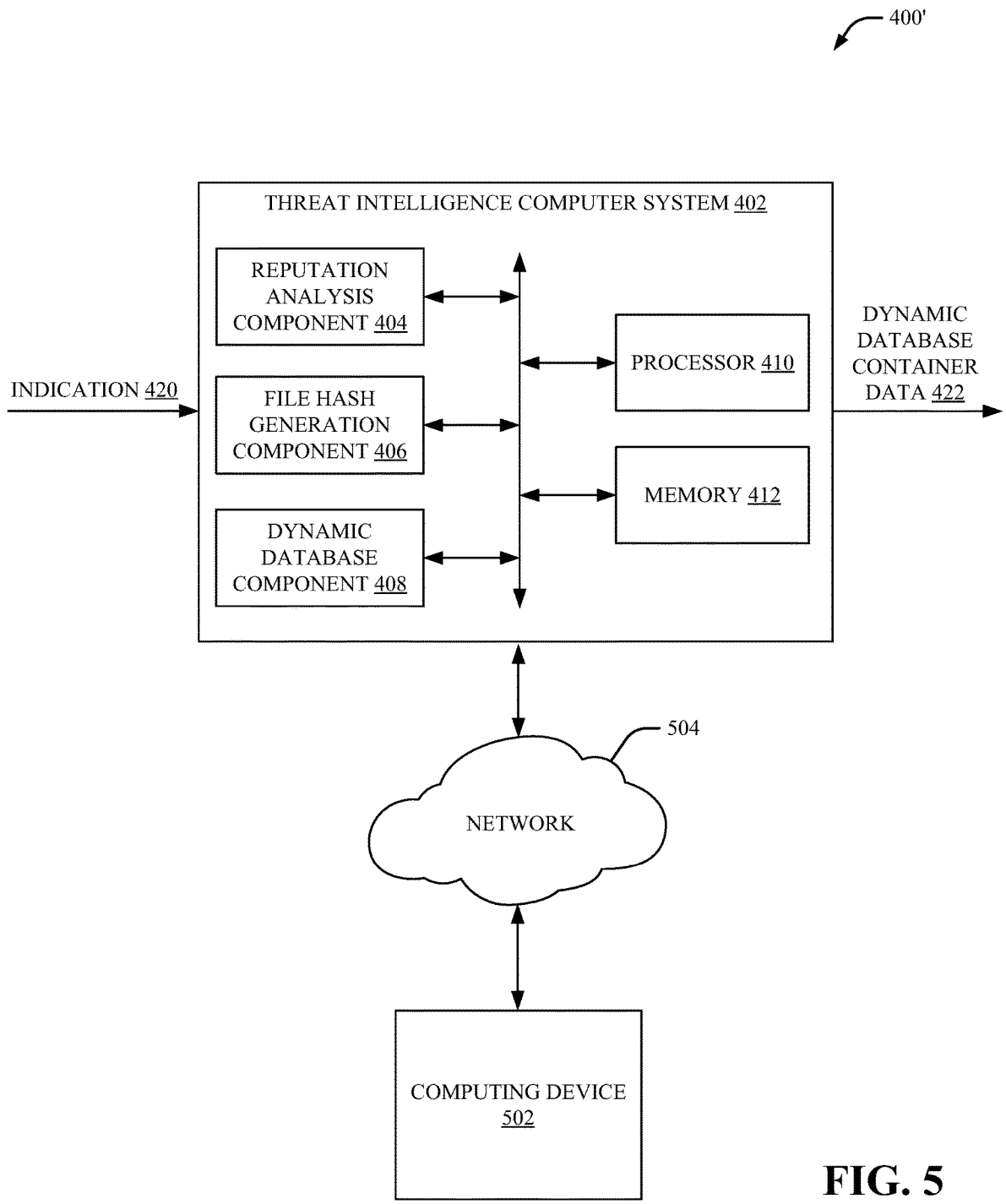
FIG. 5 illustrates another system that provides an exemplary threat intelligence computer system, in accordance with one or more embodiments described herein.

FIG. 5 illustrates a system 400' that provides an exemplary environment according to one or more described features of one or more embodiments of the disclosure. In an embodiment, the system 400' corresponds to an alternate embodiment of the system 400 shown in FIG. 4. According to an embodiment, the system 400' includes the threat intelligence computer system 402 and/or a computing device 502. In one or more embodiments, the threat intelligence computer system 402 is in communication with the computing device 502 via a network 504. The computing device 502 is a mobile computing device, a smartphone, a tablet computer, a mobile computer, a desktop computer, a laptop computer, a workstation computer, a wearable device, a virtual reality device, an augmented reality device, or another type of computing device located remote from the threat intelligence computer system 402. In one or more embodiments, the network 504 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In one or more embodiments, one or more portions of the network 504 corresponds to one or more portions of the communication network 304 and/or one or more portions of the network 110.

In one or more embodiments, in response to a determination that the reputation data is altered within the validity time period for the dynamic database container, the reputation analysis component 404 generates one or more notifications for display via an electronic interface of the computing device 502. In one or more embodiments, in response to identifying a vulnerability for the one or more industrial control files within the validity time period for the dynamic database container, the reputation analysis component 404 generates one or more notifications for display via an electronic interface of a computing device 502. In certain embodiments, in response to a determination that one or more portions of the industrial control system is associated with an idle time period, the reputation analysis component 404 compares the new reputation data with the one or more security threat hashes. Furthermore, in response to a determination that the new reputation data matches at least one security threat hash from the one or more security threat hashes, the reputation analysis component 404 generates one or more notifications for display via an electronic interface of the computing device 502. In one or more embodiments, the reputation analysis component 404 provides data associated with the reputation data to an electronic interface of the computing device 502 to facilitate visualization of the data associated with the reputation data, the new reputation data, and/or other reputation data stored in the dynamic container database 308B. In one or more embodiments, the reputation analysis component 404 configures the electronic interface of the computing device to provide control of one or more portions of the industrial control system based on the reputation data, the new reputation data, and/or other reputation data stored in the dynamic container database 308B.

In one or more embodiments, the data associated with the reputation data, the new reputation data, and/or other reputation data stored in the dynamic container database 308B includes one or more visual elements for a visual display (e.g., a user-interactive electronic interface) of the computing device 502 that renders a visual representation of the reputation data, the new reputation data, and/or other reputation data stored in the dynamic container database 308B. In certain embodiments, the visual display of the computing device 502 displays one or more graphical elements associated with the reputation data, the new reputation data, and/or other reputation data stored in the dynamic container database 308B. In certain embodiments, the visual display of the computing device 502 provides a graphical user interface to facilitate visualization of one or more security insights associated with the industrial control system 306. In one or more embodiments, the graphical user interface allows a user associated with the computing device 502 to make decisions and/or perform one or more actions with respect to the industrial control system 306.

Figure 6:
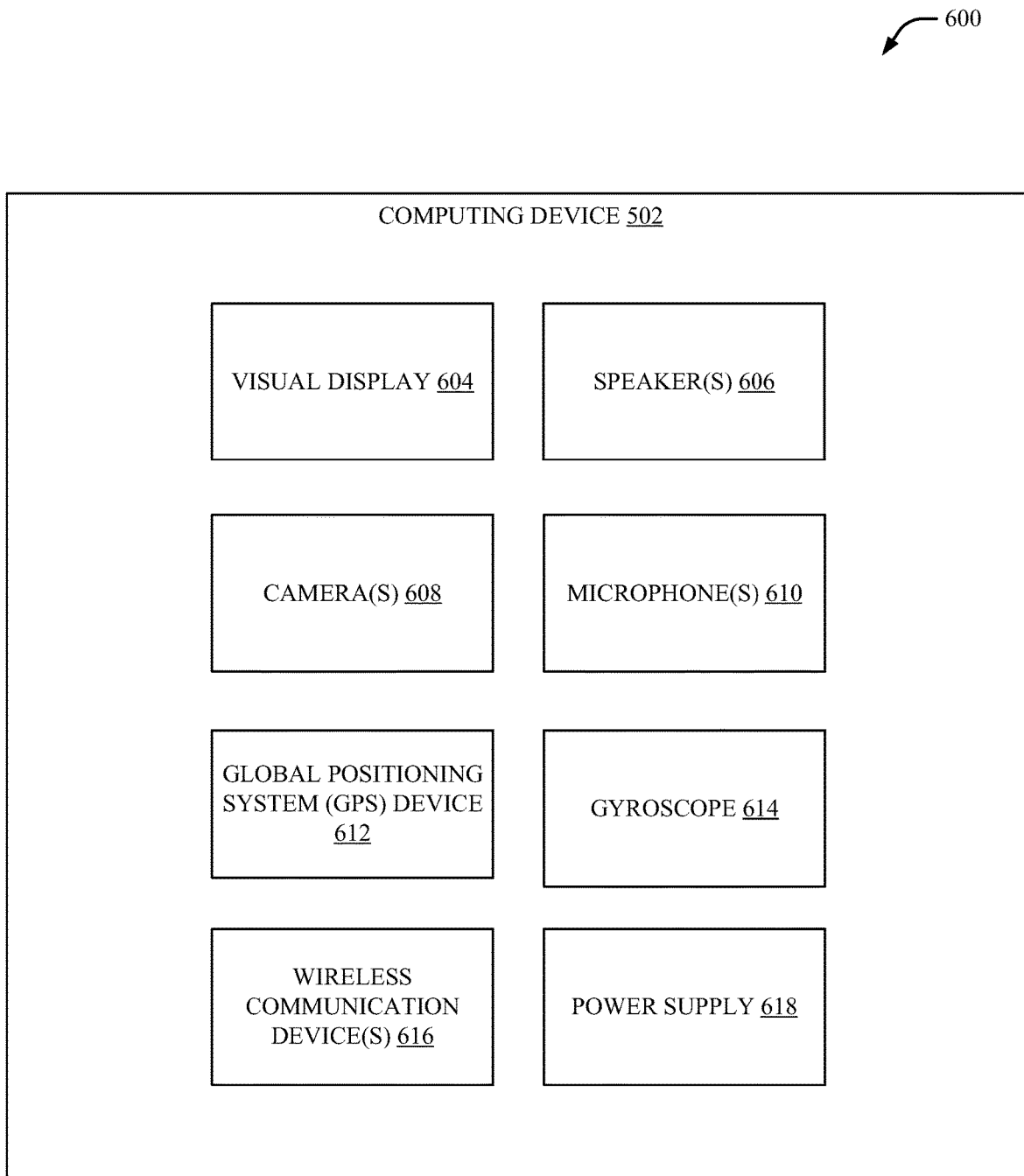
FIG. 6 illustrates an exemplary computing device, in accordance with one or more embodiments described herein.

FIG. 6 illustrates a system 600 according to one or more embodiments of the disclosure. The system 600 includes the computing device 502. In one or more embodiments, the computing device 502 employs mobile computing, augmented reality, cloud-based computing, IoT technology and/or one or more other technologies to provide video, audio, real-time data, graphical data, one or more communications one or more messages, one or more notifications, and/or other media data associated with reputation data. The computing device 502 includes mechanical components, electrical components, hardware components and/or software components to facilitate obtaining data associated with the industrial control system 306. In the embodiment shown in FIG. 6, the computing device 502 includes a visual display 604, one or more speakers 606, one or more cameras 608, one or more microphones 610, a global positioning system (GPS) device 612, a gyroscope 614, one or more wireless communication devices 616, and/or a power supply 618.

In an embodiment, the visual display 604 is a display that facilitates presentation and/or interaction with one or more portions of the action data 322. In one or more embodiments, the computing device 502 displays an electronic interface (e.g., a graphical user interface) associated with a predictive maintenance platform associated with the asset 316. In one or more embodiments, the visual display 604 is a visual display that renders one or more interactive media elements via a set of pixels. The one or more speakers 606 include one or more integrated speakers that project audio. The one or more cameras 608 include one or more cameras that employ autofocus and/or image stabilization for photo capture and/or real-time video. The one or more microphones 610 include one or more digital microphones that employ active noise cancellation to capture audio data. The GPS device 612 provides a geographic location for the computing device 502. The gyroscope 614 provides an orientation for the computing device 502. The one or more wireless communication devices 616 includes one or more hardware components to provide wireless communication via one or more wireless networking technologies and/or one or more short-wavelength wireless technologies. The power supply 618 is, for example, a power supply and/or a rechargeable battery that provides power to the visual display 604, the one or more speakers 606, the one or more cameras 608, the one or more microphones 610, the GPS device 612, the gyroscope 614, and/or the one or more wireless communication devices 616. In certain embodiments, the action data 322 associated with the one or more insights is presented via the visual display 604 and/or the one or more speakers 606.

Figure 7:
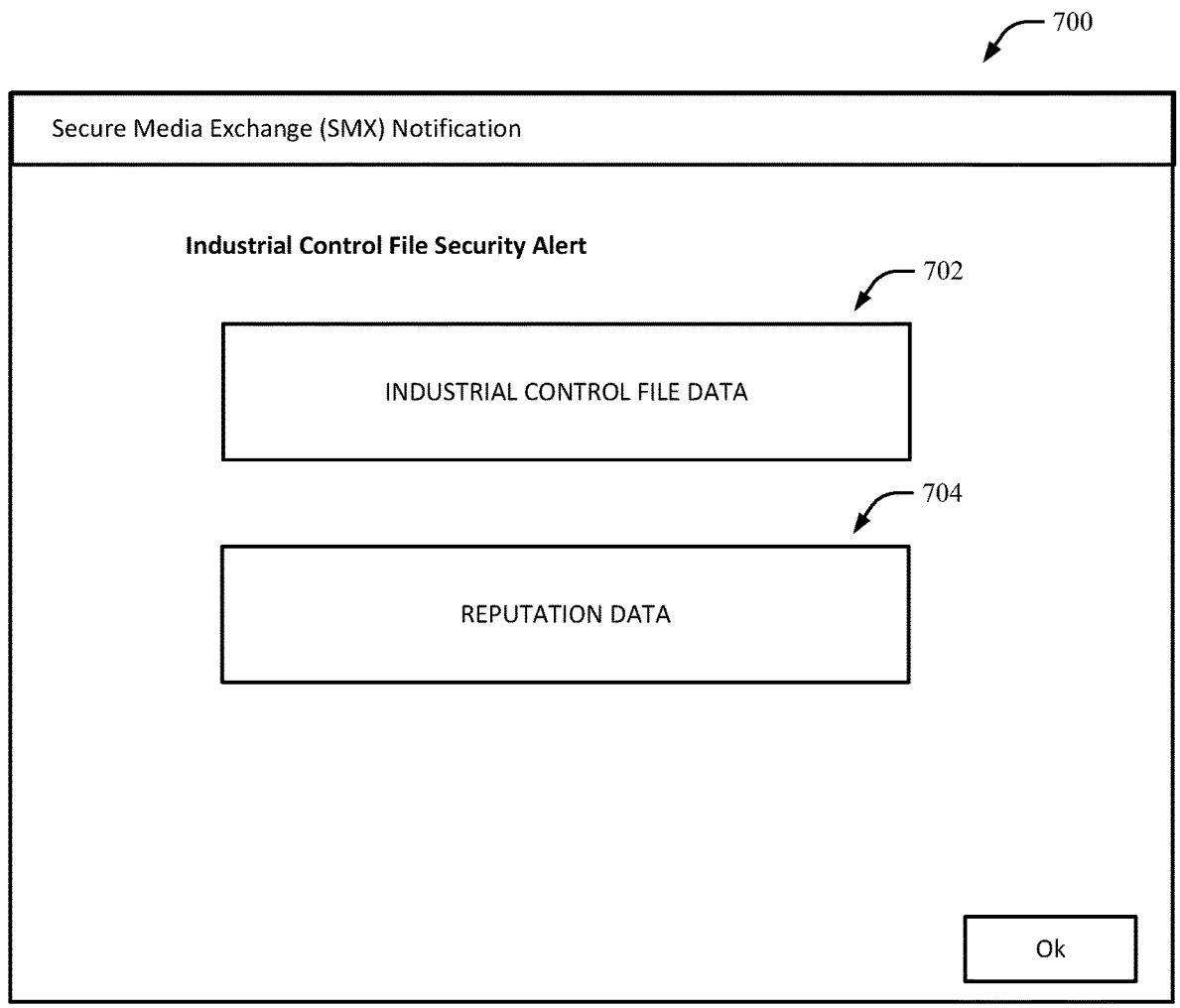
FIG. 7 illustrates an exemplary notification, in accordance with one or more embodiments described herein.

An example of the notification for the visual display 604 is illustrated in FIG. 7. For example, in one or more embodiments, a notification 700 includes industrial control file data 702 associated with information regarding one or more industrial control files of the industrial control system 306. In one or more embodiments, the notification 700 further includes reputation data 704 associated with a reputation (e.g., a security reputation) for one or more industrial control files associated with the industrial control file data 702. In one or more embodiments, the notification 700 is configured for rendering via a user interface (e.g., an electronic user interface, a graphical user interface, etc.) of the computing device 502.

Figure 8:
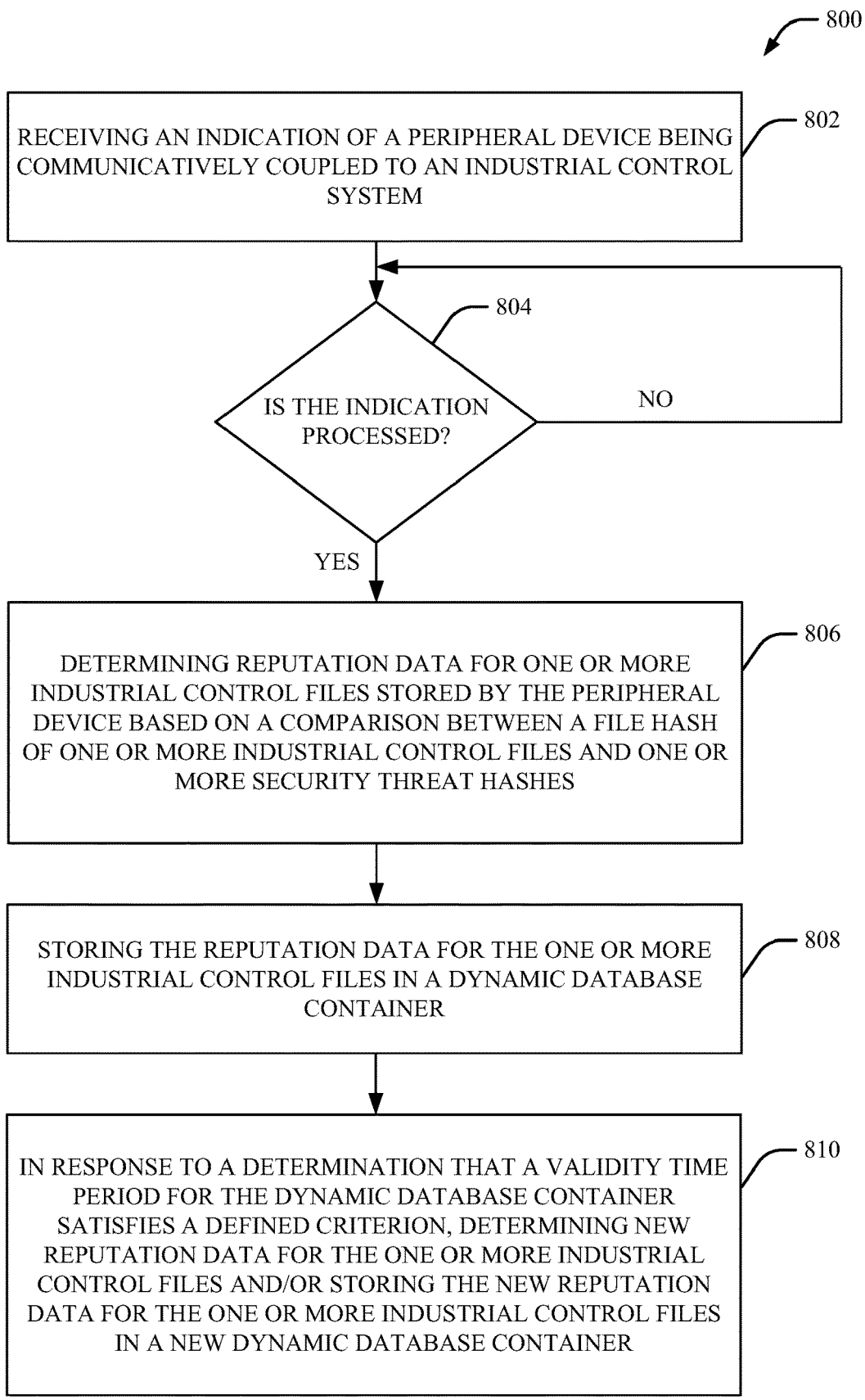
FIG. 8 illustrates a flow diagram for providing dynamic data containerization using hash data analytics, in accordance with one or more embodiments described herein.

FIG. 8 illustrates a method 800 for providing dynamic data containerization using hash data analytics, in accordance with one or more embodiments described herein. The method 800 is associated with the threat intelligence computer system 402, for example. For instance, in one or more embodiments, the method 800 is executed at a device (e.g., the threat intelligence computer system 402) with one or more processors and a memory. In one or more embodiments, the method 800 begins at block 802 that receives (e.g., by the reputation analysis component 404) an indication of a peripheral device being communicatively coupled to an industrial control system. The indication of the peripheral device being communicatively coupled to the industrial control system provides one or more technical improvements such as, but not limited to, extended functionality for an industrial control system and/or improving accuracy of data stored in a database.

At block 804, it is determined whether the indication is processed. If no, block 804 is repeated to determine whether the indication is processed. If yes, the method 800 proceeds to block 806. In response to the indication, block 806 determines (e.g., by the reputation analysis component 404), reputation data for one or more industrial control files stored by the peripheral device based on a comparison between a file hash of one or more industrial control files and one or more security threat hashes. The determining the reputation data provides one or more technical improvements such as, but not limited to, extended functionality for an industrial control system and/or improving accuracy of data stored in a database.

The method 800 also includes a block 808 that, in response to the indication, stores (e.g., by the reputation analysis component 404) the reputation data for the one or more industrial control files in a dynamic database container. The storing the reputation data in the dynamic database container provides one or more technical improvements such as, but not limited to, extended functionality for an industrial control system and/or improving accuracy of data stored in a database.

The method 800 also includes a block 808 that, in response to the indication, stores (e.g., by the reputation analysis component 404) the reputation data for the one or more industrial control files in a dynamic database container. The storing the reputation data in the dynamic database container provides one or more technical improvements such as, but not limited to, extended functionality for an industrial control system and/or improving accuracy of data stored in a database.

In response to a determination that a validity time period for the dynamic database container satisfies a defined criterion, the method 800 also includes a block 810 that, in response to the indication, determines (e.g., by the reputation analysis component 404) new reputation data for the one or more industrial control files and/or stores (e.g., by the dynamic database component 408) the new reputation data for the one or more industrial control files in a new dynamic database container. The new dynamic database container provides one or more technical improvements such as, but not limited to, extended functionality for an industrial control system and/or improving accuracy of data stored in a database.

In certain embodiments, the method 800 also includes determining a customer identifier associated with the peripheral device. In certain embodiments, the method 800 also includes determining the reputation data for the one or more industrial control files based on predetermined reputation data associated with the customer identifier. In certain embodiments, the method 800 also includes determining the validity time period for the dynamic database container based on user feedback data provided via a computing device. In certain embodiments, the method 800 also includes receiving a new indication of a new peripheral device being communicatively coupled to the industrial control system. In certain embodiments, in response to the new indication, the method 800 also includes determining other reputation data for one or more new industrial control files stored by the new peripheral device based on the reputation data stored in the dynamic database container. In certain embodiments, the method 800 also includes updating the reputation data stored in the dynamic database container based on the other reputation data. In certain embodiments, the method 800 also includes storing the other reputation data for the one or more new industrial control files in another dynamic database container.

In certain embodiments, in response to a determination that the reputation data is altered within the validity time period for the dynamic database container, the method 800 also includes generating one or more notifications for display via an electronic interface of a computing device. In certain embodiments, the method 800 also includes storing the file hash for the one or more industrial control files in the dynamic database container. In certain embodiments, in response to identifying a vulnerability for the one or more industrial control files within the validity time period for the dynamic database container, the method 800 also includes generating one or more notifications for display via an electronic interface of a computing device. In certain embodiments, the method 800 also includes storing the dynamic database container in a dynamic container database for a secure media exchange platform associated with the industrial control system.

In certain embodiments, the method 800 also includes receiving a hash query that comprises a file hash generated based on the one or more industrial control files. In certain embodiments, the method 800 also includes querying a threat intelligence database associated with one or more security threat hashes based on the hash query. In certain embodiments, the method 800 also includes receiving a hash query that comprises a file hash generated based on the one or more industrial control files. In certain embodiments, the method 800 also includes querying a dynamic container database associated with one or more reputation hashes based on the hash query.

In certain embodiments, in response to a determination that one or more portions of the industrial control system is associated with an idle time period, the method 800 also includes comparing the new reputation data with the one or more security threat hashes. In certain embodiments, in response to a determination that the new reputation data matches at least one security threat hash from the one or more security threat hashes, the method 800 also includes generating one or more notifications for display via an electronic interface of a computing device. In certain embodiments, the method 800 also includes providing data associated with the reputation data to an electronic interface of a computing device to facilitate visualization of the data associated with the reputation data. In certain embodiments, the method 800 also includes configuring the electronic interface of the computing device to provide control of one or more portions of the industrial control system based on the reputation data. In certain embodiments, the method 800 also includes providing data associated with the new reputation data to an electronic interface of a computing device to facilitate visualization of the data associated with the new reputation data. In certain embodiments, the method 800 also includes configuring the electronic interface of the computing device to provide control of one or more portions of the industrial control system based on the new reputation data.

Figure 9:
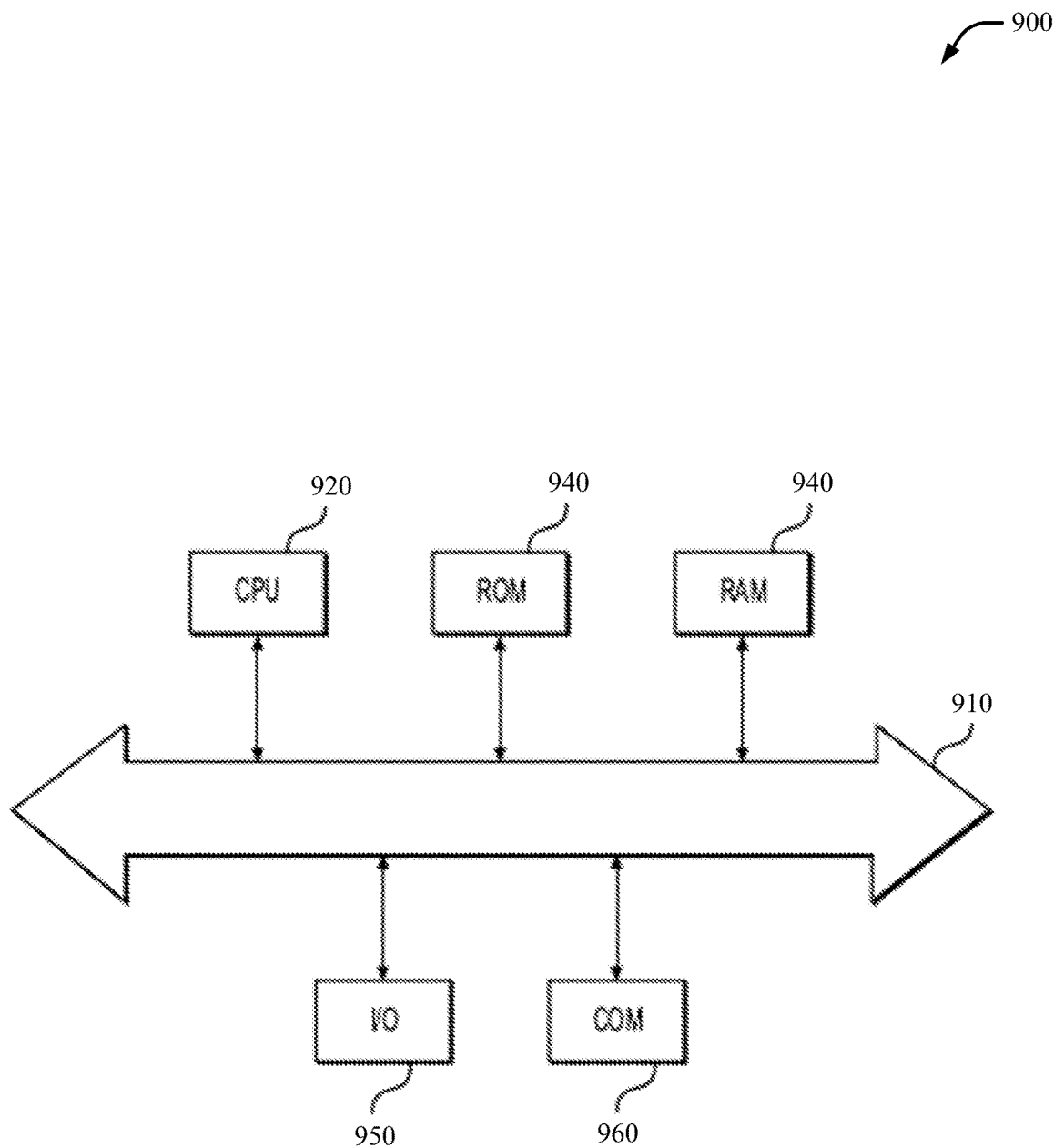
FIG. 9 illustrates a functional block diagram of a computer that may be configured to execute techniques described in accordance with one or more embodiments described herein.

FIG. 9 depicts an example system 900 that may execute techniques presented herein. FIG. 9 is a simplified functional block diagram of a computer that may be configured to execute techniques described herein, according to exemplary embodiments of the present disclosure. Specifically, the computer (or "platform" as it may not be a single physical computer infrastructure) may include a data communication interface 960 for packet data communication. The platform also may include a central processing unit ("CPU") 920, in the form of one or more processors, for executing program instructions. The platform may include an internal communication bus 910, and the platform also may include a program storage and/or a data storage for various data files to be processed and/or communicated by the platform such as ROM 930 and RAM 940, although the system 900 may receive programming and data via network communications. The system 900 also may include input and output ports 950 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
one or more processors;
a memory; and
one or more programs stored in the memory, the one or more programs comprising instructions configured to:
receive an indication of a peripheral device being communicatively coupled to an industrial control system; and
in response to the indication:
determine reputation data for one or more industrial control files stored by the peripheral device based on a comparison between a file hash of the one or more industrial control files and one or more security threat hashes;
store the reputation data for the one or more industrial control files in a dynamic database container;
determine a validity time period that is defined for the dynamic database container;
analyze the reputation data for the one or more industrial control files to determine whether the one or more industrial control files are potentially vulnerable to a security threat;
in response to identifying a vulnerability for the one or more industrial control files within the validity time period, generate one or more notifications for display via an electronic interface of a computing device; and
in response to a determination that the validity time period for the dynamic database container satisfies a defined criterion:
determine new reputation data indicative of a new reputation indicator for the one or more industrial control files; and
store the new reputation data for the one or more industrial control files in a new dynamic database container.

2. The system of claim 1, the one or more programs further comprising instructions configured to:
determine a customer identifier associated with the peripheral device; and
determine the reputation data for the one or more industrial control files based on predetermined reputation data associated with the customer identifier.

3. The system of claim 1, the one or more programs further comprising instructions configured to:
receive a new indication of a new peripheral device being communicatively coupled to the industrial control system; and
in response to the new indication,
determine other reputation data for one or more new industrial control files stored by the new peripheral device based on the reputation data stored in the dynamic database container.

4. The system of claim 3, the one or more programs further comprising instructions configured to:
update the reputation data stored in the dynamic database container based on the other reputation data.

5. The system of claim 1, the one or more programs further comprising instructions configured to:
in response to a determination that the reputation data is altered within the validity time period for the dynamic database container,
generate one or more notifications for display via an electronic interface of a computing device.

6. The system of claim 1, the one or more programs further comprising instructions configured to:
receive a hash query that comprises a file hash generated based on the one or more industrial control files; and
query a dynamic container database associated with one or more reputation hashes based on the hash query.

7. The system of claim 1, the one or more programs further comprising instructions configured to:
receive a hash query that comprises a file hash generated based on the one or more industrial control files; and
query a threat intelligence database associated with one or more security threat hashes based on the hash query.

8. The system of claim 7, the one or more programs further comprising instructions configured to:
in response to a determination that one or more portions of the industrial control system is associated with an idle time period,
compare the new reputation data with the one or more security threat hashes.

9. The system of claim 7, the one or more programs further comprising instructions configured to:
in response to a determination that the new reputation data matches at least one security threat hash from the one or more security threat hashes,
generate one or more notifications for display via an electronic interface of a computing device.

10. A method, comprising:
at a device with one or more processors and a memory:
receiving an indication of a peripheral device being communicatively coupled to an industrial control system; and
in response to the indication:
determining reputation data for one or more industrial control files stored by the peripheral device based on a comparison between a file hash of the one or more industrial control files and one or more security threat hashes;
storing the reputation data for the one or more industrial control files in a dynamic database container;
determining a validity time period that is defined for the dynamic database container;
analyzing the reputation data for the one or more industrial control files to determine whether the one or more industrial control files are potentially vulnerable to a security threat;
in response to identifying a vulnerability for the one or more industrial control files within the validity time period, generating one or more notifications for display via an electronic interface of a computing device; and
in response to a determination that the validity time period for the dynamic database container satisfies a defined criterion:
determining new reputation data indicative of a new reputation indicator for the one or more industrial control files; and
storing the new reputation data for the one or more industrial control files in a new dynamic database container.

11. The method of claim 10, further comprising:
determining a customer identifier associated with the peripheral device, the determining the reputation data for the one or more industrial control files comprising determining the reputation data for the one or more industrial control files based on predetermined reputation data associated with the customer identifier.

12. The method of claim 10, further comprising:
receiving a new indication of a new peripheral device being communicatively coupled to the industrial control system; and
in response to the new indication,
determining other reputation data for one or more new industrial control files stored by the new peripheral device based on the reputation data stored in the dynamic database container.

13. The method of claim 12, further comprising:
updating the reputation data stored in the dynamic database container based on the other reputation data.

14. The method of claim 10, further comprising:
in response to a determination that the reputation data is altered within the validity time period for the dynamic database container,
generating one or more notifications for display via an electronic interface of a computing device.

15. The method of claim 10, further comprising:
receiving a hash query that comprises a file hash generated based on the one or more industrial control files; and
querying a threat intelligence database associated with one or more security threat hashes based on the hash query.

16. The method of claim 15, further comprising:
in response to a determination that one or more portions of the industrial control system is associated with an idle time period,
comparing the new reputation data with the one or more security threat hashes.

17. The method of claim 15, further comprising:
in response to a determination that the new reputation data matches at least one security threat hash from the one or more security threat hashes,
generating one or more notifications for display via an electronic interface of a computing device.

18. A non-transitory computer-readable storage medium comprising one or more programs for execution by one or more processors of a device, the one or more programs including instructions which, when executed by the one or more processors, cause the device to:
receive an indication of a peripheral device being communicatively coupled to an industrial control system; and
in response to the indication:
determine reputation data for one or more industrial control files stored by the peripheral device based on a comparison between a file hash of the one or more industrial control files and one or more security threat hashes;
store the reputation data for the one or more industrial control files in a dynamic database container;
determine a validity time period that is defined for the dynamic database container;
analyze the reputation data for the one or more industrial control files to determine whether the one or more industrial control files are potentially vulnerable to a security threat;
in response to identifying a vulnerability for the one or more industrial control files within the validity time period, generate one or more notifications for display via an electronic interface of a computing device; and
in response to a determination that the validity time period for the dynamic database container satisfies a defined criterion:
determine new reputation data indicative of a new reputation indicator for the one or more industrial control files; and
store the new reputation data for the one or more industrial control files in a new dynamic database container.

19. The non-transitory computer-readable storage medium of claim 18, wherein the instructions, when executed by the one or more processors, further cause the device to:
determine a customer identifier associated with the peripheral device; and
determine the reputation data for the one or more industrial control files based on predetermined reputation data associated with the customer identifier.

20. The non-transitory computer-readable storage medium of claim 18, wherein the instructions, when executed by the one or more processors, further cause the device to:
receive a new indication of a new peripheral device being communicatively coupled to the industrial control system; and
in response to the new indication,
determine other reputation data for one or more new industrial control files stored by the new peripheral device based on the reputation data stored in the dynamic database container.

* * * * *